US010162852B2

(12) United States Patent
Chiticariu et al.

(10) Patent No.: US 10,162,852 B2
(45) Date of Patent: Dec. 25, 2018

(54) CONSTRUCTING CONCEPTS FROM A TASK SPECIFICATION

(71) Applicant: International Business Machines Corporation, Armonk, NY (US)

(72) Inventors: Laura Chiticariu, San Jose, CA (US); George A. Cypher, Aptos, CA (US); Rajasekar Krishnamurthy, Campbell, CA (US); Yunyao Li, San Jose, CA (US); Huahai Yang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 14/107,077

(22) Filed: Dec. 16, 2013

(65) Prior Publication Data

US 2015/0169742 A1 Jun. 18, 2015

(51) Int. Cl.
*G06F 17/30* (2006.01)

(52) U.S. Cl.
CPC .. *G06F 17/30401* (2013.01); *G06F 17/30427* (2013.01); *G06F 17/30554* (2013.01); *G06F 17/30654* (2013.01)

(58) Field of Classification Search
CPC .......... G06F 17/30654; G06F 17/2705; G06F 17/30424; G06F 17/30569; G06F 17/30554; G06F 17/2785
USPC ................................................ 707/769–771
See application file for complete search history.

(56) References Cited

U.S. PATENT DOCUMENTS

| | | | |
|---|---|---|---|
| 6,741,986 B2 | 5/2004 | Cho et al. | |
| 7,627,588 B1 * | 12/2009 | Mohan | G06F 17/30654 |
| 7,827,125 B1 * | 11/2010 | Rennison | G06F 17/3066 706/14 |
| 7,870,117 B1 * | 1/2011 | Rennison | G06F 17/3066 707/706 |

(Continued)

FOREIGN PATENT DOCUMENTS

| | | |
|---|---|---|
| CN | 102110140 A | 6/2011 |
| CN | 103440314 A | 12/2013 |

OTHER PUBLICATIONS

Liu, J. et al., "Harvesting and Summarizing User-Generated Content for Advanced Speech-Based HCI," IEEE Journal of Selected Topics in Signal Processing, v.6, n.8, pp. 982-992, Dec. 2012.

(Continued)

*Primary Examiner* — Monica M Pyo
(74) *Attorney, Agent, or Firm* — Cantor Colburn LLP (57) ABSTRACT

Embodiments relate to facilitating construction of concepts from a task specification. A method includes receiving, from a user via a user interface, a task specification in natural language form. The method also includes parsing the task specification into a plurality of components, and searching a database for an existing concept having a pattern that approximates at least a portion of the plurality of components. The concept includes semantic meanings that are representable by textual patterns. The method further includes identifying any components of the plurality of components that are not included in the existing concept, and building a new concept that combines the existing concept and the components of the plurality of components that are not included in the existing concept.

17 Claims, 5 Drawing Sheets

(56) References Cited

U.S. PATENT DOCUMENTS

| | | | |
|---|---|---|---|
| 7,987,416 | B2 | 7/2011 | Loeser et al. |
| 8,001,064 | B1* | 8/2011 | Rennison ............ G06F 17/3066 706/14 |
| 8,024,329 | B1* | 9/2011 | Rennison ............ G06F 17/3066 707/706 |
| 8,266,148 | B2 | 9/2012 | Guha et al. |
| 8,429,179 | B1 | 4/2013 | Mirhaji |
| 2002/0198885 | A1* | 12/2002 | Streepy, Jr. ....... G06F 17/30958 |
| 2005/0043940 | A1* | 2/2005 | Elder .................. G06F 17/3043 704/9 |
| 2008/0046450 | A1* | 2/2008 | Marshall ........... G06F 17/30734 |
| 2009/0182702 | A1* | 7/2009 | Miller ............... G06F 17/30654 706/60 |
| 2010/0228693 | A1* | 9/2010 | Dawson .............. G06F 17/2705 706/12 |
| 2011/0106807 | A1 | 5/2011 | Srihari et al. |
| 2011/0307435 | A1 | 5/2011 | Overell et al. |
| 2012/0226974 | A1* | 9/2012 | Mohan ..................... G06N 5/02 715/256 |
| 2012/0310868 | A1 | 12/2012 | Martins |

OTHER PUBLICATIONS

Lau, G. et al., "Legal Information Retrieval and Application to E-Rulemaking," ICAIL '05, Proceedings of the 10th International Conference on Artificial Intelligence and Law, Jun. 6-11, 2005, ACM, 2005, 9 pages.

Sushain Pandit, "Ontology-Guided Extraction of Structured Information from Unstructured Text: Identifying and Capturing Complex Relationships," Thesis, Iowa State University, 2010, 82 pages.

\* cited by examiner

CONSTRUCTING CONCEPTS FROM A TASK SPECIFICATION

BACKGROUND

The present disclosure relates generally to application development, and more specifically, to constructing concepts from a task specification.

Information extraction is the process of extracting data from unstructured or semi-structured text. Information extraction is the basic building block of many enterprise applications including, e.g., regulatory compliance, social media analytics, and searches, to name a few. Such applications require information extraction programs with very high accuracy and coverage; however, building such information extraction rules is an extremely labor intensive process.

BRIEF SUMMARY

Embodiments include a method, computer program product, and system for constructing concepts from a task specification.

The method includes receiving, from a user via a user interface, a task specification in natural language form. The method also includes parsing the task specification into a plurality of components and searching a database for an existing concept having a pattern that approximates at least a portion of the plurality of components. The concept includes semantic meanings that are representable by textual patterns. The method further includes identifying any components of the plurality of components that are not included in the existing concept, and building a new concept that combines the existing concept and the components of the plurality of components that are not included in the existing concept.

The computer program product includes a computer readable storage medium having program code embodied therewith. The program code is executable by a computer to receive, from a user via a user interface of a computer processing device, a task specification in natural language form. The program code is further executable to parse the task specification into a plurality of components and search a database for an existing concept having a pattern that approximates at least a portion of the plurality of components. The concept includes semantic meanings that are representable by textual patterns. The program code is further executable to identify any components of the plurality of components that are not included in the existing concept, and build a new concept that combines the existing concept and the components of the plurality of components that are not included in the existing concept.

The system includes a memory having computer readable computer instructions and a processor for executing the computer readable instructions to perform a method. The method includes receiving from a user via a user interface, a task specification in natural language form, parsing the task specification into components, and searching a database for an existing concept having a pattern that approximates at least a portion of the components. The concept includes semantic meanings that are representable by textual patterns. Upon determining from the searching that no existing concept having the pattern exists in the database, the method includes creating a concept for the task specification that includes the components and relationships among the components. Upon determining an existing concept is stored in the database, the method includes determining whether the existing concept includes components that satisfy each of the components from the task specification. Based on determining that the existing concept includes components that satisfy each of the components from the task specification, the method includes retrieving the existing concept and displaying, via the user interface, the existing concept and corresponding components. Based on determining that the existing concept does not satisfy each of the components from the task specification, the method includes retrieving the existing concept and providing an option, via the user interface, to generate a new concept that includes a combination of the existing concept and the components from the task specification that are not satisfied by the existing concept.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Exemplary embodiments provide for construction of concepts from a task specification. A concept may be described as semantic meanings that are representable by textual patterns. As information extractors can be written to represent these textual patterns, these extractors are conveniently referred to as concepts. The exemplary processes may be performed on any type of data, such as structured, unstructured, and semi-structured. The processes facilitate developers or lay persons in the labor intensive tasks associated with information extraction by enabling end users to specify the building of a concept using natural language terms, automatically identifying existing concepts contained in a task specification, automatically identifying new concepts to be built based on the task specification, and automatically identifying how existing concepts and new concepts are related to each other based on the task specification. These and other features of the exemplary embodiments will now be described Turning now to FIGS. 1 and 2, a flow diagram of a process 100 in conjunction with a user interface screen in accordance with embodiments are generally shown. The process 100 of FIG. 1 assumes that a user has accessed a program and is initiating a search for a concept.

Figure 2:
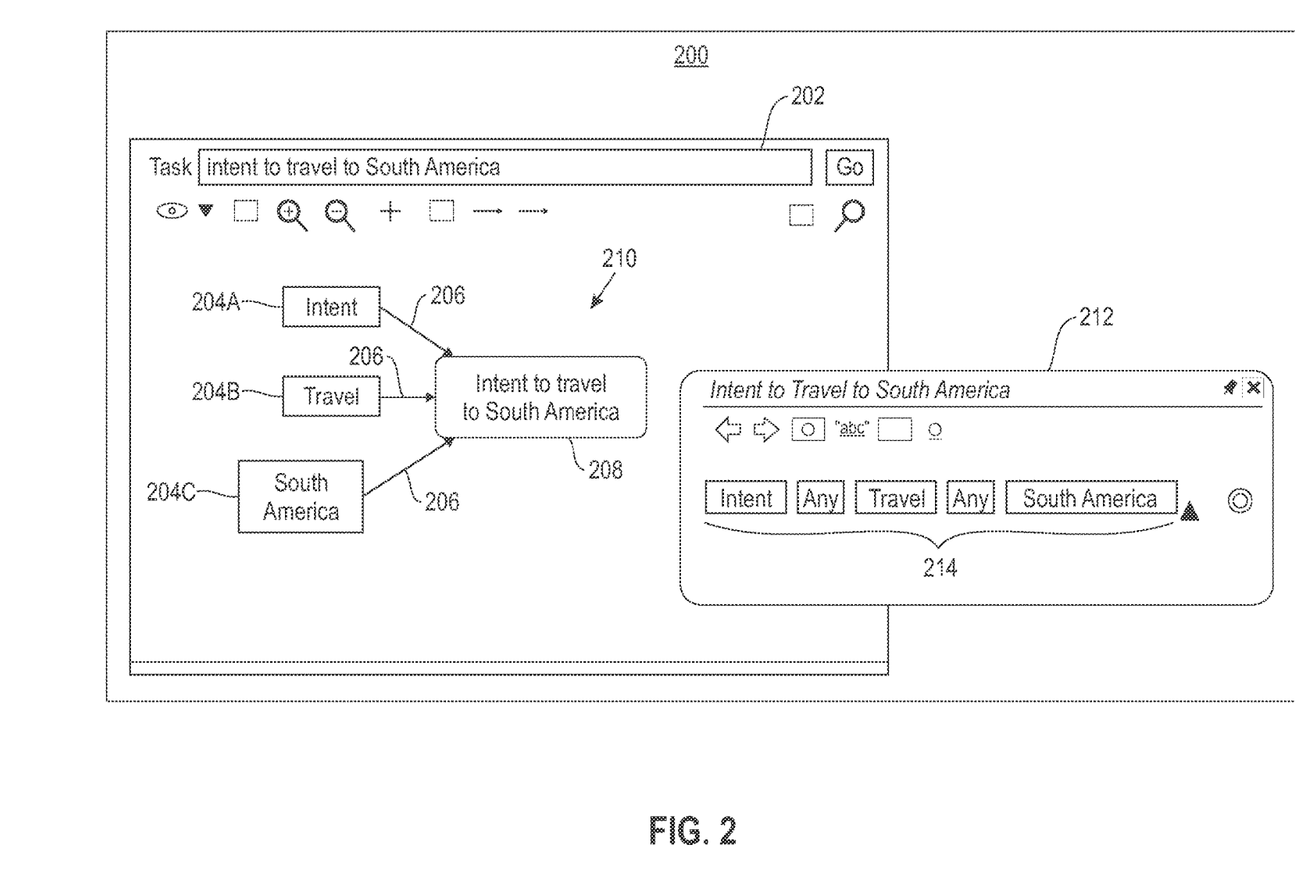
FIG. 2 depicts a user interface screen of a computer device through which concepts can be created and displayed in accordance with an embodiment.

At block 102, a task specification is received from a user via a user interface of a computer device. A user interface screen is presented to the user. As illustrated in FIG. 2, a user interface screen 200 with sample data is provided. The task specification is entered by the user via a task bar 202 in natural language form. As shown in FIG. 2, by way of example, the user has entered "Intent to travel to South America."

Figure 1:
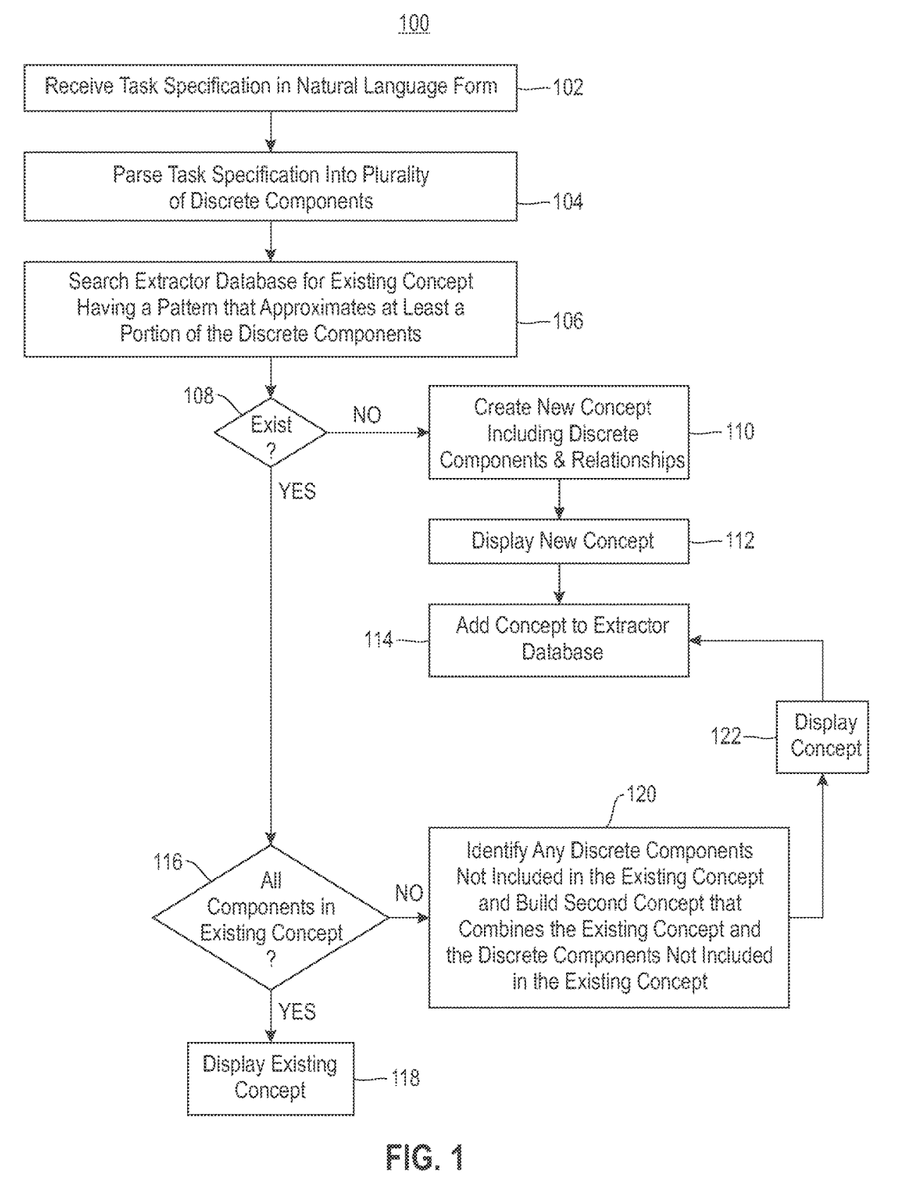
FIG. 1 depicts a flow diagram of a process for constructing concepts from a task specification in accordance with an embodiment.

At block 104, the task specification is parsed into a plurality of discrete components. Discrete components (also referred to herein as "components") reflect separate, individual elements or terms of the task specification. The discrete components for the above-referenced example may be "Intent," "travel," and "South America." A grammatical analysis may be performed to identify discrete components including, e.g., primary terms, verbs, subject and predicate, modifiers, etc., as well as relationships among the components.

At block 106, a search query is created from the discrete components and relationships among the discrete components. As shown in FIG. 2, for example, a window 212 illustrates a search query 214 with selectable options for determining relationships. The process 100 searches an extractor database for an existing concept having a pattern that approximates at least a portion of the plurality of discrete components. The extractor database may include a library of pre-configured (e.g., system configured) and user-generated and/or modified concepts.

At block 108, the process 100 determines if an existing concept is stored in the extractor database based on the search (e.g., at least a portion of the discrete components from the search query are found in the database).

At block 110, upon determining that no existing concept is stored in the extractor database, the process 100 creates a new concept (referred to herein as "Concept A") for the task specification that includes the plurality of discrete components and relationships among the plurality of discrete components. At block 112, Concept A and its discrete components are displayed via the user interface. The Concept A is displayed in natural language form, along with decomposed discrete components and relationships. The relationships are displayed, e.g., through a connective line between the components and the concept. At block 114, the Concept A is added to the extractor database. As shown in FIG. 2, the Concept A 208 in natural language form is shown with its discrete components 204A, 204B, and 204C and corresponding relationships 206 (collectively, the natural language form concept 208, components 204A, 204B, and 204C, and relationships 206 are referred to as "concept 210).

If, however, the existing concept is found in the extractor database, the process 100 determines whether all of the discrete components from the query are included in the existing concept at block 116. If so, the process 100 displays the existing concept via the user interface at block 118. The existing concept is displayed in natural language form, along with decomposed discrete components and relationships.

Otherwise, if not all (i.e., a portion) of the discrete components from the query are included in the existing concept (block 116), the process 100 identifies any discrete components of the plurality of discrete components that are not included in the existing concept and builds a second concept (referred to herein as "Concept B" to differentiate it from Concept A) that interrelates the existing concept with the discrete components from the query that are not included in the existing concept at block 120. Suppose, e.g., that an existing concept "overseas travel" was found in the database, but it did not include "South America." In this embodiment, the process 100 creates another concept (Concept B) to interrelate the existing concept "overseas travel" with the discrete component "South America." This interrelation process is further described in FIG. 3.

At block 122, the process 100 displays the Concept B via the user interface and saves the Concept B in the extractor database at block 114. The Concept B may be displayed in natural language form, along with decomposed discrete components and relationships. The Concept B may be defined as the aggregation of the existing concept and the individual discrete components not included in the existing concept.

Optionally, the process 100 may create an alternative concept from the discrete components not found in the Concept A that is independent of the existing concept. In this embodiment, the existing concept stands alone and the alternative concept stands alone and the two concepts are connected by a relationship. The alternative concept is displayed in its natural language form along with its decomposed discrete components and relationships. In addition, the relationship between the Concept A and the Concept B is displayed. This embodiment is described further below with respect to editing concepts.

In an embodiment, the relationships between the existing concept and the alternative concept are determined from contextual information derived from discrete components of the existing concept and the discrete components of the alternative concept (e.g., "Intent" and "to").

Figure 3:
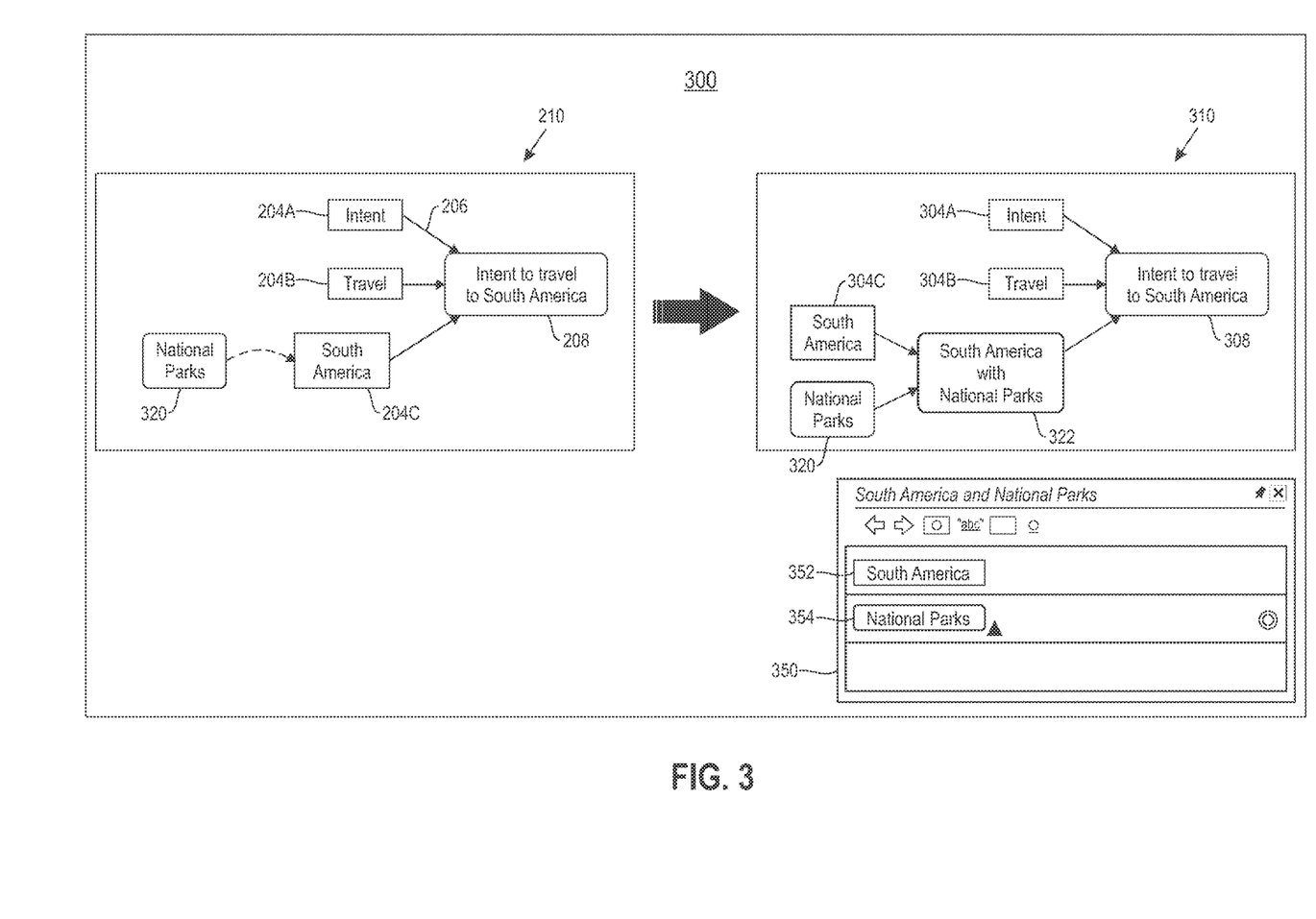
FIG. 3 depicts a scenario in which a user amends an existing concept to create a new concept in accordance with an embodiment.

In an embodiment, a user may edit existing concepts as desired. Turning now to FIG. 3, a process for editing an existing concept is described. For example, suppose that the concept 210 (Concept A) from FIG. 2 has been created and stored in the extractor database. The user may then access this concept through the user interface. As shown in FIG. 3, the user desires to add "National Parks" 320 to the concept 210. In this embodiment, the user, via a user interface screen 300 of FIG. 3, selects drags an icon for National Parks 320, which icon may be created and/or selected via a subwindow 350, to the component 204C (South America). In doing so, a new concept 322 is created (South America with National Parks) which consists of components 304C and 320.

Additionally, as shown in FIG. 3, the existing concept 210 (Concept A), which now includes the new concept 322 is represented as concept 310. Thus, concepts 308 and 322 may stand alone as independent concepts, and/or may be integrated as a single concept 310. The editing of these concepts can be facilitated through the window 350 and selectable discrete components 352 and 354 of the user interface screen 300.

Figure 4:
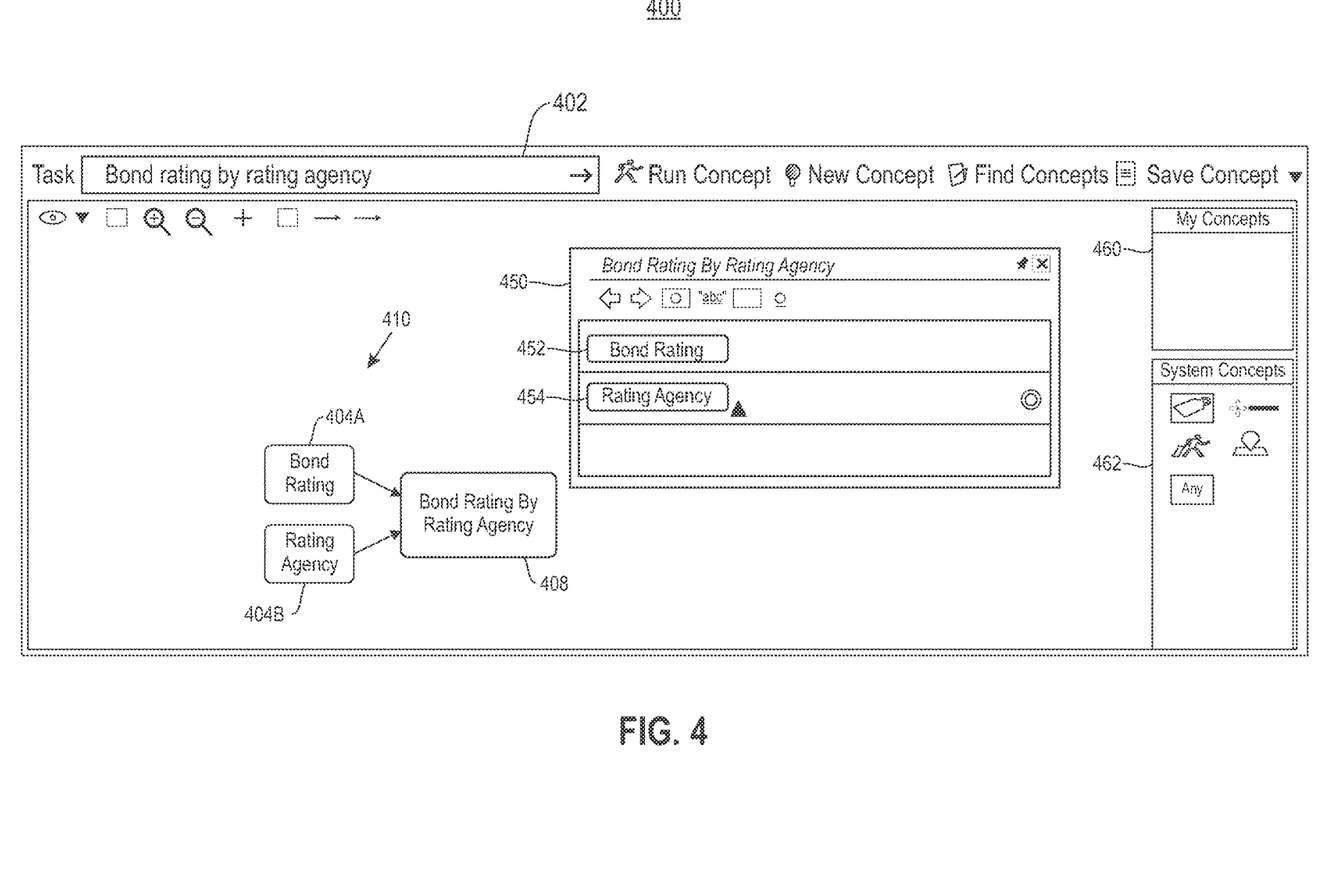
FIG. 4 depicts a user interface screen of a computer device depicting creation of a concept where no pre-built concepts have been supported in accordance with an embodiment.

In an embodiment in which no pre-existing concepts are stored for a particular query, a default mechanism may be implemented for creating a new concept. Turning now to FIG. 4, this default method will now be described. As shown in FIG. 4, a user interface screen 400 is presented to a user, and the user enters a task specification in a toolbar 402. As shown by way of illustration, the user has entered "Bond rating by rating agency." In this embodiment illustrating a default method, the system has not found any existing concepts in the extractor database. The system parses the search query into two noun phrases, "bond rating" and "rating agency," and these two phrases are used as distinct concepts 404A and 404B. In this manner, each concept 404A and 404B is treated as a dictionary concept with its noun phrase as an entry in the extractor database, and the combined new concept, "Bond Rating By Rating Agency" 408 is a union of the two concepts 404A and 404B, which are sub-concepts to the concept 408. Collectively, the combined concept 408 and its sub-concepts 404A and 404B are referred to as an integrated concept 410. Relationships may be determined and related as described above with respect to FIG. 2.

The editing of these concepts can be facilitated through a window 450 and selectable concepts 452 and 454 of the user interface screen 400. As shown in FIG. 4, the user interface screen 400 may also display a library of user-created concepts in a subwindow 460 and a library of system-generated concepts in a window 462.

Figure 5:
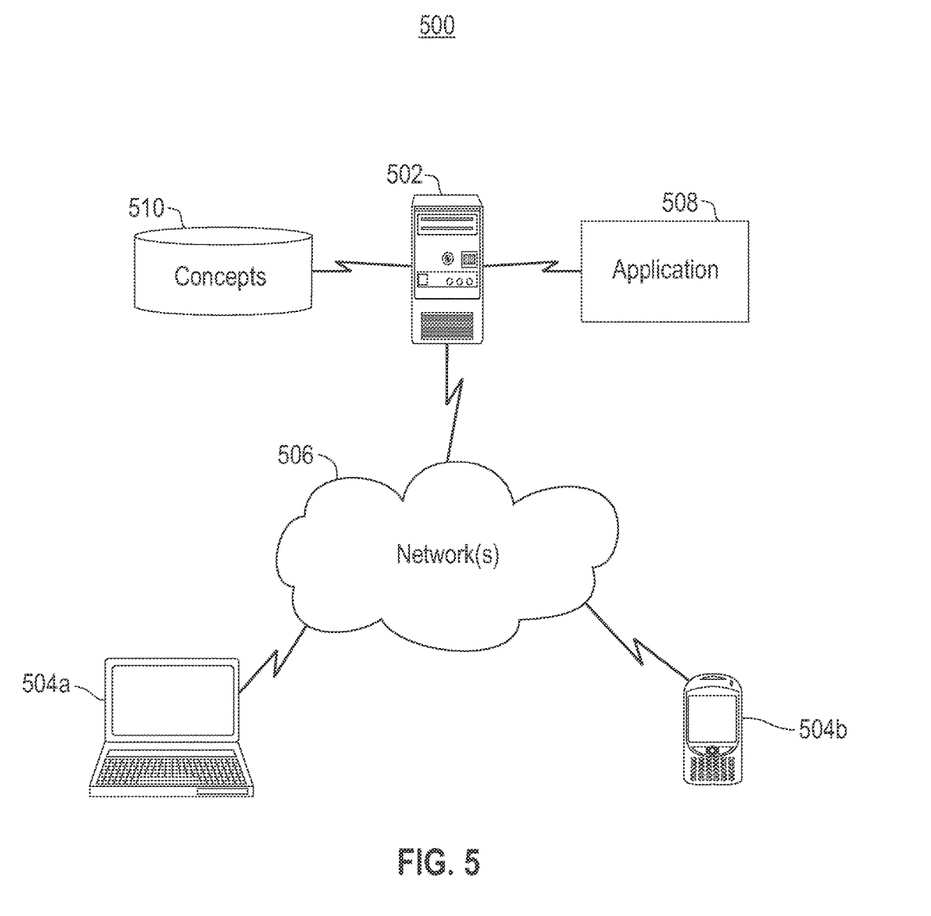
FIG. 5 is a system upon which concepts from a task specification are constructed in accordance with an embodiment.

Turning now to FIG. 5, a system 500 upon which construction concepts from a task specification may be implemented in an embodiment will now be described.

The system 500 includes a host system computer 502 and computer devices 504a and 504b communicatively coupled to one or more network(s) 506. The host system computer 502 may be implemented as one or more high-speed computer processing devices, such as one or more mainframe computers or servers capable of handling a high volume of computing activities conducted by end users of the concept construction tool. The host system computer 502 may operate as a database server and coordinate access to application data including data stored on a storage device 510. The storage device 510 may be implemented using memory contained in the host system computer 502 or may be a separate physical device. In an embodiment, the storage device 510 includes the extractor database described above and stores concepts within a library that may include both user-created concepts and system-generated concepts.

The host system computer 502 may be implemented using one or more servers operating in response to a computer program stored in a storage medium accessible by the server. The host system computer 502 may also operate as a network server (e.g., a web server) to communicate with the computer devices 504a and 504b, as well as any other network entities. In an embodiment, the host system computer 502 may represent a node in a cloud computing environment or may be configured to operate in a client/server architecture.

The computer devices 504a and 504b may be any type of devices with computer processing capabilities. For example, the computer device 504a may be one of a general-purpose computer (e.g., desktop, lap top) and a host-attached terminal (e.g., thin client), while computer device 504b may be a portable communication device (e.g., smart phone, personal digital assistant, and tablet PC). The computer devices 504a and 504b may be wired or wireless devices. In an embodiment, the computer devices 504a and 504b may represent cloud consumers in a cloud computing environment.

In an embodiment, the computer devices 504a and 504b may be implemented by end users of a website or web service hosted by an entity or enterprise operating the host system computer 502. The computer devices 504a and 504b may each execute a web browser for accessing network entities, such as the host system computer 502. In an embodiment, the computer devices 504a and 504b access a web site of the host system computer 502 for browsing and accessing an application 508. The application 508 implements the concept construction processes described herein.

In an alternative embodiment, the host system computer 502 may be a network computer that services the computer devices 504a and 504b in a business enterprise environment in which the networks 506 include a private network, such as a virtual private network or intranet.

In yet a further embodiment, the application 508 may reside on the communication devices 504a and 504b, as a stand-alone client, instead of the host system computer 502.

The network(s) 506 may be any type of known networks including, but not limited to, a wide area network (WAN), a local area network (LAN), a global network (e.g. Internet), a virtual private network (VPN), and an intranet. The network(s) 506 may be implemented using a wireless network or any kind of physical network implementation known in the art, e.g., using cellular, satellite, and/or terrestrial network technologies.

Technical effects and benefits provide for construction of concepts from a task specification. The exemplary processes may be performed on any type of data, such as structured, unstructured, and semi-structured. The processes facilitate developers or lay persons in the labor intensive tasks involved with information extraction by enabling end users to specify the building of a concept using natural language terms, automatically identifying existing concepts contained in a task specification, automatically identifying new concepts to be build based on the task specification, and automatically identifying how existing concepts and new concepts are related to each other based on the task specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method, comprising:

receiving, from a user via a user interface, a task specification in natural language form;

parsing, by a processor, the task specification into a plurality of components by performing a grammatical analysis to identify the plurality of components and relationships among the plurality of components, wherein the plurality of components comprise a primary term, a verb, a subject, and a modifier;

creating, by the processor, a search query from the plurality of components and the relationships among the plurality of components, wherein the search query comprises selectable options for determining the relationships;

searching, by the processor and using the search query, a database for an existing concept having a pattern that approximates at least a portion of the plurality of components, the concept including semantic meanings that are representable by textual patterns;

identifying, by the processor, any components of the plurality of components that are not included in the existing concept;

building, by the processor, a new concept that combines the existing concept and the components of the plurality of components that are not included in the existing concept; and displaying, via the user interface, the new concept in natural language form, decomposed components of the new concept, and corresponding relationships between the new concept and the decomposed components of the new concept, wherein the corresponding relationships are displayed through a connective line between the new concept and the decomposed components of the new concept.

2. The method of claim 1, further comprising displaying, via the user interface, the existing concept in natural language form.

3. The method of claim 1, further comprising displaying, via the user interface, decomposed components of the existing concept and corresponding relationships.

4. The method of claim 1, further comprising displaying, via the user interface, a relationship between the existing concept and the new concept through a connective line.

5. The method of claim 1, further comprising:
providing, via the user interface, an option to modify at least one of:
the existing concept and corresponding relationships; and
the new concept and corresponding relationships, and
amending, in response to user input via the user interface, the at least one of the existing concept and corresponding relationships and the new concept and corresponding relationships to reflect modifications from the user input.

6. The method of claim 1, wherein the new concept represents a first concept, the method further comprising:
building a second concept from the components of the plurality of components that are not included in the existing concept.

7. The method of claim 6, further comprising:
displaying, via the user interface, the second concept, corresponding components of the second concept, and corresponding relationships.

8. The method of claim 6, further comprising:
determining relationships between the existing concept, the first concept, and the second concept from contextual information derived from components of the existing concept, the components of the first concept, and the components of the second concept.

9. The method of claim 1, further comprising:
receiving, via the user interface, another task specification in natural language form;
parsing the other task specification into another plurality of components;
searching the database for an existing concept having a pattern that approximates at least a portion of the other plurality of components;
upon determining that no existing concept is stored in the database, creating a third concept for the task specification that includes the other plurality of components and relationships among the other plurality of components; and
displaying the third concept via the user interface.

10. The method of claim 1, wherein the new concept that combines the existing concept and the components of the plurality of components that are not included in the existing concept represents a union of the existing concept and the components of the plurality of components that are not included in the existing concept.

11. A computer program product, comprising:
a computer readable storage medium having program code embodied therewith, the program code executable by a processor to implement:
receiving, from a user via a user interface, a task specification in natural language form;
parsing, by the processor, the task specification into a plurality of components by performing a grammatical analysis to identify the plurality of components and relationships among the plurality of components, wherein the plurality of components comprise a primary term, a verb, a subject, and a modifier;
creating, by the processor, a search query from the plurality of components and the relationships among the plurality of components, wherein the search query comprises selectable options for determining the relationships;
searching, by the processor and using the search query, a database for an existing concept having a pattern that approximates at least a portion of the plurality of components, the concept including semantic meanings that are representable by textual patterns;
identifying, by the processor, any components of the plurality of components that are not included in the existing concept;
building, by the processor, a new concept that combines the existing concept and the components of the plurality of components that are not included in the existing concept; and
displaying, via the user interface, the new concept in natural language form, decomposed components of the new concept, and corresponding relationships between the new concept and the decomposed components of the new concept, wherein the corresponding relationships are displayed through a connective line between the new concept and the decomposed components of the new concept.

12. The computer program product of claim 11, wherein the program code executable by the computer further implements displaying, via the user interface:
the existing concept in natural language form, decomposed components of the existing concept, and corresponding relationships; and
a relationship between the existing concept and the new concept.

13. The computer program product of claim 12, wherein the program code executable by the computer further implements:
providing, via the user interface, an option to modify at least one of:
the existing concept and corresponding relationships; and
the new concept and corresponding relationships, and
amending, in response to user input via the user interface, the at least one of the existing concept and corresponding relationships and the new concept and corresponding relationships to reflect modifications from the user input.

14. The computer program product of claim 11, wherein the new concept represents a first concept, and the program code executable by the computer further implements:
building a second concept from the components of the plurality of components that are not included in the existing concept.

15. The computer program product of claim 14, wherein the program code executable by the computer further implements:

displaying, via the user interface, the second concept, corresponding components of the second concept, and corresponding relationships.

16. The computer program product of claim 14, wherein the program code executable by the computer further implements:
determining relationships between the existing concept, the first concept, and the second concept from contextual information derived from components of the existing concept, the components of the first concept, and the components of the second concept.

17. A system, comprising:
a memory having computer readable computer instructions; and
a processor for executing the computer readable instructions to perform a method comprising:
receiving, from a user via a user interface, a task specification in natural language form;
parsing, by the processer, the task specification into a plurality of components by performing a grammatical analysis to identify the plurality of components and relationships among the plurality of components, wherein the plurality of components comprise a primary term, a verb, a subject, and a modifier;
creating, by the processor, a search query from the plurality of components and the relationships among the plurality of components, wherein the search query comprises selectable options for determining the relationships;
searching, by the processor and using the search query, a database for an existing concept having a pattern that approximates at least a portion of the plurality of components, the concept including semantic meanings that are representable by textual patterns;
identifying, by the processor, any components of the plurality of components that are not included in the existing concept;
building, by the processor, a new concept that combines the existing concept and the components of the plurality of components that are not included in the existing concept; and
displaying, via the user interface, the new concept in natural language form, decomposed components of the new concept, and corresponding relationships between the new concept and the decomposed components of the new concept, wherein the corresponding relationships are displayed through a connective line between the new concept and the decomposed components of the new concept.

\* \* \* \* \*